(12) United States Patent
Nielsen

(10) Patent No.: US 8,427,284 B2
(45) Date of Patent: Apr. 23, 2013

(54) MULTI MEDIA CONTROLLER

(75) Inventor: Kaj Nielsen, Thyholm (DK)

(73) Assignee: Bang & Olufsen A/S, Struer (DK)

( * ) Notice: Subject to any disclaimer, the term of this patent is extended or adjusted under 35 U.S.C. 154(b) by 487 days.

(21) Appl. No.: 12/451,760

(22) PCT Filed: May 29, 2008

(86) PCT No.: PCT/EP2008/056583
§ 371 (c)(1),
(2), (4) Date: Nov. 30, 2009

(87) PCT Pub. No.: WO2008/145682
PCT Pub. Date: Dec. 4, 2008

(65) Prior Publication Data
US 2010/0163383 A1 Jul. 1, 2010

Related U.S. Application Data

(60) Provisional application No. 60/924,777, filed on May 31, 2007.

(51) Int. Cl.
*G08C 19/16* (2006.01)
(52) U.S. Cl.
USPC ..... 340/12.31; 340/5.61; 340/5.62; 340/5.63; 348/731; 348/734; 455/352; 455/355
(58) Field of Classification Search .............. 340/12.31, 340/5.61–5.63; 348/731–734; 455/352–355
See application file for complete search history.

(56) References Cited

U.S. PATENT DOCUMENTS

| | | | |
|---|---|---|---|
| 7,123,180 B1* | 10/2006 | Daniell et al. | 341/176 |
| 2002/0122080 A1 | 9/2002 | Kunii et al. | |
| 2002/0197064 A1 | 12/2002 | Bijsmans et al. | |
| 2004/0227742 A1* | 11/2004 | Fateh et al. | 345/204 |
| 2007/0169115 A1* | 7/2007 | Ko et al. | 717/174 |
| 2008/0134784 A1* | 6/2008 | Jeng et al. | 73/514.01 |
| 2010/0090968 A1* | 4/2010 | Lee et al. | 345/173 |

FOREIGN PATENT DOCUMENTS

| | | |
|---|---|---|
| EP | 1 536 315 | 6/2008 |
| GB | 2 416 387 | 1/2006 |
| WO | WO 91/12599 | 8/1991 |

OTHER PUBLICATIONS

"Rotary Commander Operating Instructions", Sony Corporation, 1995.

* cited by examiner

*Primary Examiner* — Hai Phan
*Assistant Examiner* — Ojiako Nwugo
(74) *Attorney, Agent, or Firm* — Harness, Dickey & Pierce P.L.C.

(57) ABSTRACT

A multifunction unit for control of multimedia equipment; the unit might act as a stand-alone device or being integrated into the multimedia equipment. Different individual combinations of individual objects enable for different functional capabilities. The multifunction unit for control of multimedia equipment has access to external sources via standard network interfaces and protocols.

20 Claims, 5 Drawing Sheets

MULTI MEDIA CONTROLLER

CROSS-REFERENCE TO RELATED APPLICATIONS

This application is a National Stage application of international application number PCT/EP2008/056583 filed on May 29, 2008, and claims priority under 35 U.S.C. §119 to U.S. Provisional Application No. 60/924,777 filed on May 31, 2007, the entire content of which is hereby incorporated by reference in its entirety.

BACKGROUND OF THE INVENTION

During several years consumer electronics have been more and more advanced offering a huge amount of information and features. This increase in complexity complicates the man-machine interface as well, leaving the user with difficulties in operating a system.

Typically different systems offer miscellaneous set of operational behaviours at the command level, and many attempts have been made to simplify and unify the access and control, across different types of equipment.

An example of this is the introduction of a universal remote control, addressing and being able to control different types of equipment. Very few companies have succeeded to launch a remote controller—addressing multi media equipment—where the demand for ease of use has been fulfilled.

SUMMARY OF THE INVENTION

The present invention discloses an interactive terminal; the device being able to communicate interactively with a plurality of sources of media information.

Part of the interactive terminal is a component based multifunction unit that might be configured into different embodiments of a media controller.

The interactive terminal may be embedded as a control unit into the multimedia equipment or it may be configured to be a stand alone unit to work in a two way communication mode. The interactive terminal may be configured with a graphical information display screen.

The primary goal of the functional capabilities of the invention is to optimize the user friendliness in the control and access to media information of any kind: audio, video, photo, telecommunication, and digital data sources, Pod cast and alike.

The data to be accessed from/to the interactive terminal is offered from local sources (e.g. DVD's, Audio/Video equipment, Hard disks, SD cards, computers, and PC's) or from external sources with digital data, like the internet, or from any other type of local network.

To enhance the use ability seen from a user prospective the terminal having a plurality of buttons of different types.

According to a first aspect, the invention relates to a multifunction unit for control of multimedia equipment, the unit comprising one or more of:

a first object comprising a part adapted to detect a rotational movement in a predetermined plane, the part being engageable by a user at an upper surface at least substantially in the plane or at a circumferential surface portion at least substantially in the plane, a second object comprising a part adapted to detect a rotational movement along a circumferential surface portion at least substantially in the plane, a third object having one, two or more user activatable elements positioned in or at an outer circumference at least substantially in the predetermined plane, and an other object comprising one, two or more user activatable elements at or in a surface at least substantially along the predetermined plane.

In the present context, the individual objects may be interconnected, such as electrically interconnected in order for e.g. a single processor (positioned in one of the objects) to be able to determine activations of the individual user activatable elements and output (using communication means positioned in one of the objects) corresponding information to the multimedia equipment.

In this respect, the individual objects may have engaging means adapted to fix one object to another and/or electrical contact means adapted to transfer electrical signals and/or power between objects.

Also, a user activatable object may be any type of element adapted to provide an electrical signal or a signal determinable by an electrical circuit, such as a rotatable wheel or element, a touch pad/screen, a push button, an element engaging a strain gauge or a resistor/potentiometer, or the like.

Naturally, the first object may comprise a rotatable element or a touch pad engageable at a surface thereof in the plane, such as from above, if the surface is horizontal. Thus, the detected rotational movement may be that of the rotatable element or the touch, such as along a closed path, of e.g. a finger or stylus. Alternatively, the element may be engageable only at a circumferential part of the object, so that the engagement is substantially in the plane but from the side.

The same means and the latter manner of engaging may also be useful in the second object.

Naturally, all objects may, along a direction perpendicular to the plane, have the same outer contour in order for the assembled control unit to have a pleasant look and feel, or may have varying outer contours (such as that of a cone or pyramid) in order to provide the controller with a desired outer contour. Naturally, the element of the first or second object(s) may be engageable along all of the outer contour of the object or only a part thereof.

Another aspect of the invention relates to having a multifunction unit where:

a first object being a rotational device configured to have the rotational axis perpendicular to the horizontal surface plane of the multifunction unit, two or more buttons disposed inside the perimeter of the rotational device where the two or more buttons are aligned along one or more of the radial lines having the centre point in the centre of the rotating device, a second object being a rotational device configured to have the rotational axis parallel to the rotational axis of the first object, a third object being a device configured to have one or more buttons on the surface of the perimeter of the third object, and a fourth object being a device that constitutes the fixture for an assembly including the first object and the second object and the third object.

Naturally, the first and second objects may be combined, as may all embodiments of the invention.

According to another aspect of the invention, the unit may comprise a display and relate to a multifunction unit where the fourth object is configured with means to mount a display screen on to the fourths object.

According to yet another aspect of the invention a support stand may be part of the terminal, and relate to a multifunction unit where a fifth object is configured with means to mount the third object to the fifth object.

Also, the fifth object may be configured with means to attach the fifth object to a sixth object, which may function as a support device. This sixth object could be configured with means to act as a wall hanger, a table stand a floor stand.

According to yet another aspect of the invention the multifunction unit may be part of a multimedia control system device. Thus, this aspect relates to a multimedia device having integrated the multifunction unit, where the multimedia device comprises:

means for presenting information accessed from/to external sources and information related to processing of data and information on the unit itself, the information being any of type like text, graphics, audio, video, Tele and interactive media data, and means for executing control commands and responses as given from the multifunction unit.

According to yet another aspect of the invention, the unit may be a component of a multimedia system, a system with integrated components or a system where the different equipment components are connected via wired or wireless networks. Thus, the multimedia device may have access to/from external data sources via a wireless and/or wired standard interface and protocol.

Naturally, the above individual components may be combined in several configurations according to actual functional requirement of the device. Thus, the multimedia device may include different combinations of the individual multifunction objects. These configurations constitute a working device by combining two or more objects.

SHORT DESCRIPTION OF THE FIGURES

In the following, preferred embodiments are described with reference to the drawing, wherein.

DETAILED DESCRIPTION

A multimedia controller is provided where the device may have a plurality of different physical buttons on one or more of dedicated parts of the device. The actual function that might be operated via these buttons reflects at any time the actual mode of operation of the equipment and the information available from the equipment that's under control. In addition, any combination of the objects may be selected depending on the equipment to be controlled and the type of controlling signals or activations desired or required.

The interconnection (which may be fixed or disengageable) of the objects is not illustrated or described in that this may easily be obtained by the skilled person. In one embodiment, the individual objects may have electrical connections on one or two opposing sides thereof in order to electrically connect to each other. In order to ensure independence of the order in which objects are attached to each other, these electrical connections may be positioned identically on each object (over a cross section of the engaging or touching surfaces of the objects).

As it is clear that the controller may have any number and combination of the objects, the following description will focus on controllers having a plurality of such objects.

Several types of buttons are available:

Scroll wheel for operating functions to search for media information and data.

Scroll wheel for operating functions of analogue nature like volume and sound quality regulation.

Push down keys for operating control commands.

Miscellaneous keys like lever—and slider buttons for operating control commands

A display screen may be attached as an interactive part of the device. The actual content on the display reflects at any time the actual mode of operation, and acts at the same time as display of the current state of operation and the legal set of functions enabled for operation at this stage. In addition it displays information/data that's offered from the source in control.

From a user's point of view, the input device as described above is very simple to use in that the device for example may be comfortable placed on a table, on a stand or an a wall mount as required. A big selections unit in terms of a rotational wheel is available directly. Thus navigation through a menu may be accomplished very easily and depending on the user given input the user may easily traverse through the hierarchy of the menus offering information and/or other control commands. Dedicated selection—or navigations keys further facilitates the traversing through menu structures and perform functional selections of features and actions to initiate.

As an equal alternative as being a stand-a-lone device, the device may be integrated in a piece of electronic equipment. Thus the physical buttons may be manipulated by a user in order to control the equipment (computer, hi-fi, TV, air-condition or whatever home appliance equipment the device is integrated into).

The modular concept of the multifunction unit makes it possible to configure different embodiments based on the same objects. In the combinations indicated below the stand object (object 6) is in all configuration considered to be optional i.e. it may be there or not:

| wheel & keys object 1 | Wheel object 2 | Keys object 3 | display frame object 4 | Fixture object 5 | Stand object 6 |
| --- | --- | --- | --- | --- | --- |
| X | X | X | X | X | (x) |
| X | X | X |   | X | (x) |
| X |   | X | X | X | (x) |
| X |   | X |   | X | (x) |
| X | X |   | X | X | (x) |
| X | X |   |   | X | (x) |
| X |   |   | X | X | (x) |
| X |   |   |   | X | (x) |

According to the actual configurations, the multifunction unit supports one or two external interfaces.

The communication between the multifunction unit and the electronic equipment which is to be controlled may be provided in any known manner such as for example infrared, ultra sound, radio signals, Blue Tooth technology or any other well-known method.

If display unit is external the multifunction unit communicates wired or wire less with the display unit on a separate connection line.

Figure 1:
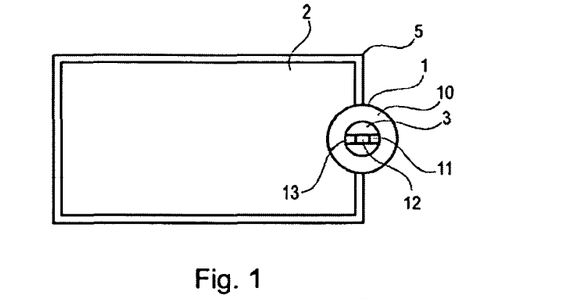
FIG. 1 gives one example of the interactive multimedia media control device according to one embodiment of the invention, the display screen and the multifunction unit.

FIG. 1 gives the top view of one example of the multifunction unit (1) with an integrated display (2). This is a preferred embodiment where the unit acts as an interactive media controller (5).

The display screen is a full function graphical screen of any type, e.g. LCD, OLED and plasma or alike. As advanced option the screen may be a touch sensitive screen.

The user interface is supported by the first object rotational wheel (10) and the push buttons (11) with the example of the buttons next (12), previous (11) and play/pause (13).

Standard and well known principles are applied for sensing user given inputs via push buttons and wheel rotation.

Standard and well known principles are applied for driving the graphical display screen.

Figure 2:
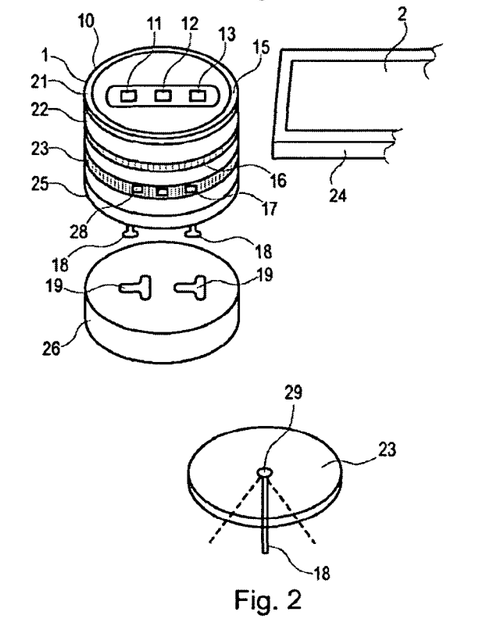
FIG. 2 gives an example of the multifunction unit objects that constitutes the interactive multimedia media control device.

FIG. 2 gives an example of the multifunction unit (1) in a preferred embodiment with:
- A first object (21) with a rotational wheel (10) and with two or more push buttons (11,12,13). The rotation of the wheel is stimulated by the user operating on the surface of the object (15).
- A second object (22) implemented as a rotational wheel. The rotation of the wheel is stimulated by the user operating on the perimeter of the object (16).
- A third object (23) implemented with one more buttons on the perimeter of the object (17). In the preferred embodiment one button is implemented as a lever arm (28) having the centre of rotation (29) parallel with the centre line of wheel of the first object (10).
- A fourth object (24) implemented as a frame fixture for a display screen (2).
- According to actual industrial design requirements the object (24) may be mounted in between object 1 and object 2 or alternatively be mounted in between object 2 and object 3.
- A fifth object (25) implemented as the bottom of the device (1) having taps/recesses (18) enabling the part to be a fixture and connection onto an optional stand (26) having appropriate taps/recesses (19) that makes it possible to connect object five (25) to the stand object six (26).

Figure 3:
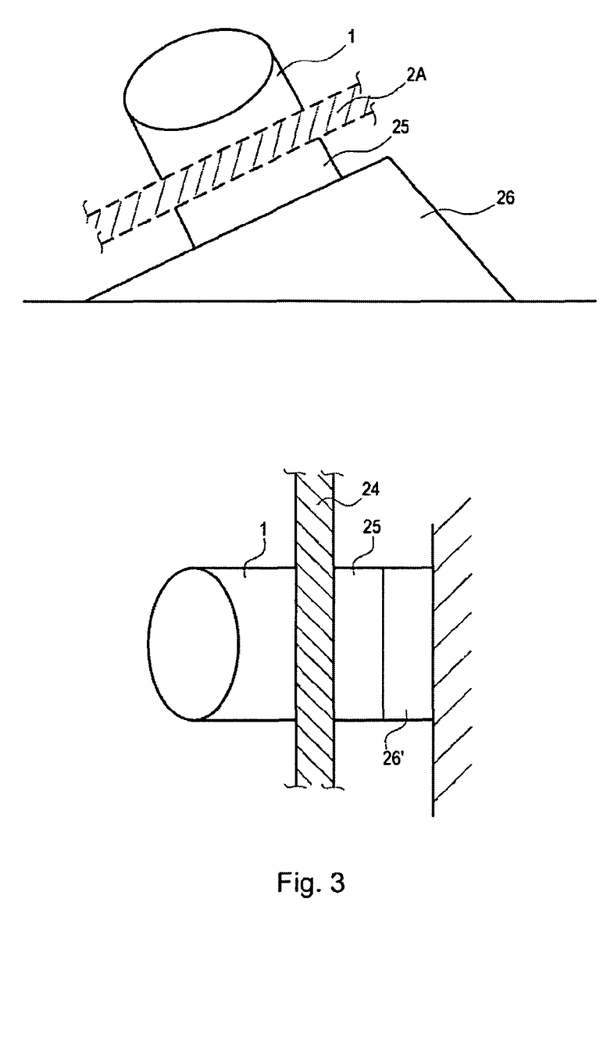
FIG. 3 gives an example of the interactive multimedia media control device as mounted in a table stand and in a wall mount.

FIG. 3 illustrates an example of the interactive multimedia media control device as mounted in a table stand (26) and in a wall mount (26').

In a preferred embodiment the invention support control of a multimedia system including access to digital media files.

The following illustrates some examples of the operational capabilities of the multifunction unit One aspect is to use the wheel to browse and search for information.

When browsing it is possible to apply a number of tools described below.

By applying viewing and sorting features, objects may be identified and presented graphically along the peripheral of the wheel.

The collaboration of views are for instance, View=Artist, Select=Madonna and View=Song. The result is the list of Madonna songs around the wheel.

The sorting is the ways that the items are sorted inside a list:
- Alphabetical—This is the default sorting algorithm in the views
- Album Track Order—the original track order inside a favourite list or inside the play list queue.
- Chronologically—Albums sorted by year. Used in the album cover view.

Figure 4:
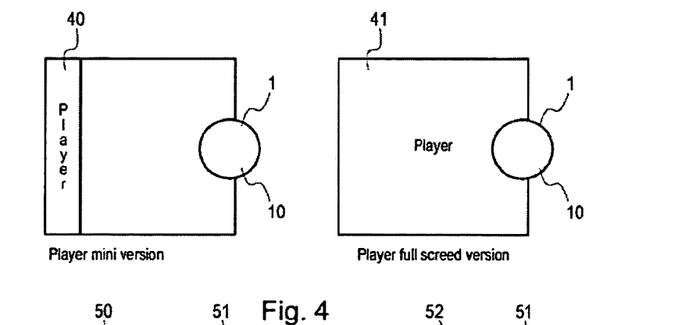
FIGS. 4-8 give examples of control functions executed via the multifunction unit.

FIG. 4 displays how another aspect is to use the wheel (10) to activate playing the media object.

There are two versions of the player:
- A mini version (40). This is shown while the browser is active. This version is just to indicate player activity/state;
- A full screen version (41). This version is of course for information purposes, but furthermore in this situation the local controls are used for operating the player, instead of the browser.

The full screen version may be shown in low intensity.

Figure 5:
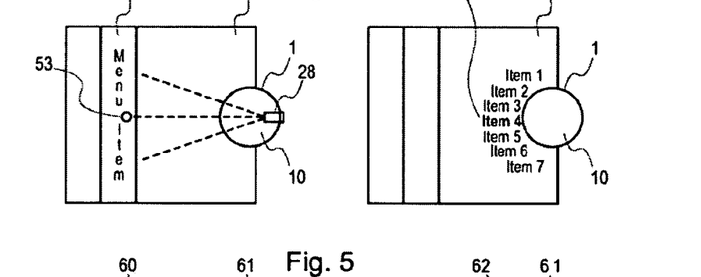

FIG. 5 displays how all sublevels (and the content of submenus, i.e. values and options, are placed at the right side of the screen (50). Navigation between items of these levels is done with the scroll wheel (10), moving the items (51) with the wheel (10). The currently selected item is the one in the middle and is highlighted (52).

Regarding submenus of the first menu level i.e. items shown at the left side of the screen (50), the currently selected submenu will automatically be shown, when the lever point/cursor (53) is stopped at an item. The lever point/cursor (53) is a graphical indication pointed by the mechanical position of the lever arm (28).

Thus entering a submenu of the first level is done simply by moving the lever point (53) to the wanted position.

Figure 6:
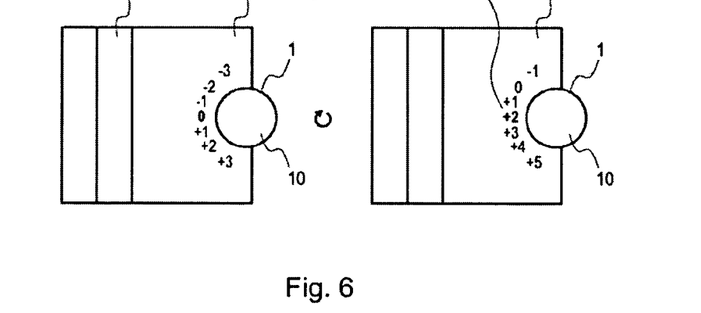

FIG. 6 displays how another aspect is to use the wheel (10) or the analogue wheel (22,16) to control analogue settings and regulations (volume, bass, treble etc.).

Setting menus have the range of values shown at the right side of the screen (61). The main rule is that the currently stored value is the one which is highlighted (62) when entering the menu. The setting is then adjusted by turning the scroll wheel (10) or the analogue wheel (22,16), moving the range of values with the wheel. The value in the middle is always the current adjusted value, and is highlighted (62). The currently stored value will keep an indication of this, so that it can be seen what is stored and what is temporarily adjusted.

Figure 7:
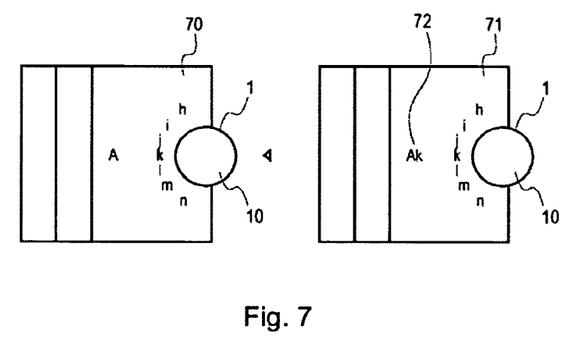

FIG. 7 displays how another aspect is to use the wheel (10) to enter and manage textual information (71).

This method applies for all types of adjustments, including text input where all available characters will be around the wheel (71). When entering text, the 'Previous' and 'Next' keys (11,12,13) have special functions. The 'Previous' is used for accepting the highlighted character and 'Next' is used for deleting the last character in the text string.

Alternatively, the 'Play' key (11,12,13) can also be used for accepting characters.

Regarding upper/lowercase characters:

When entering characters, the character set around the wheel will automatically swap between the upper and lower case version. The first character in each word (the first character after a separator character) of a name, will be uppercase the rest will be lowercase characters. Separator characters are:
<space># & * - ., /

However, the user can at any time manually swap between the upper and lowercase character sets, by means of the "upper/lowercase" symbol in the sequence of characters.

When the user has entered the $2^{nd}$ uppercase character in a row, the character set doesn't swap back to lowercase but stays uppercase for the rest of that word.

Figure 8:
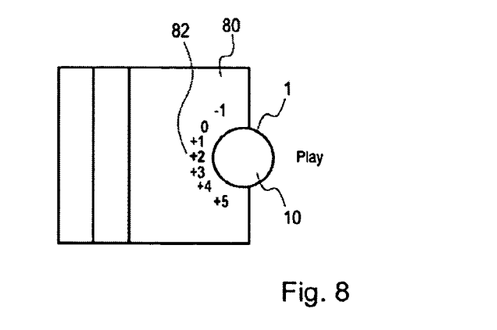

FIG. 8 displays how settings (80) are stored by pressing the 'Play' key, i.e. turn the scroll (10) wheel to highlight the wanted value and press 'Play' (11,12,13).

Figure 9:
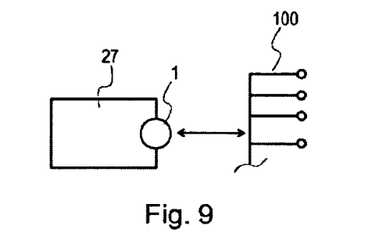
FIG. 9 gives an example of a system configurations and network connections.

FIG. 9 illustrates how the multifunction unit (1) may be combined with a display device (27) to constitute a multi media control device for access of a plurality of distributed media sources.

The multifunction device (1) may gain access from/to external data sources (110) via a standard network and protocol (100). The connection may be wired or wireless, e.g. as Ethernet, USB as a Bluetooth or WiFi or a like as appropriate.

A plurality of different units might be controlled and accessed like: DTV, TV, CD, DVD, DAB, Audio, Radio, Media Source, DVB-s, DVB-t, Video, Net Music, Net Radio, PC, Tele, Phone, Camera, Home Appliances of any kind e.g. washing machines.

Figure 10:
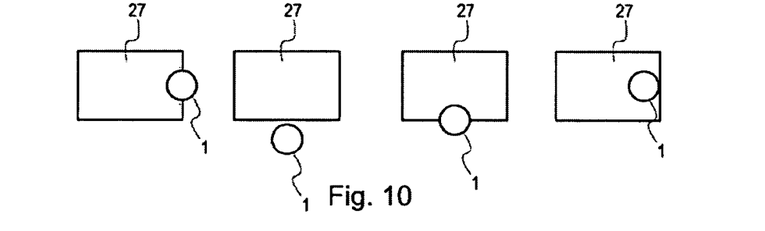
FIGS. 10 & 11 give examples of alternative system configurations.

FIG. 10 illustrates examples of how the multifunction unit (1) may be combined with a display (27) to constitute a multi media control device:
 partly integrated along a border line—overlapping the display frame,
 along a border line—not overlapping the display frame,
 fully integrated along a border—overlapping the display frame,
 partly integrated along a top/bottom border—overlapping the display frame.

Figure 11:
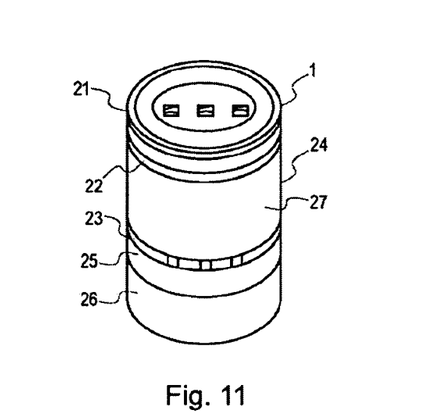

FIG. 11 illustrates an example of an alternative embodiment of the invention.

The display frame (24) is fully integrated into the assembly of the other objects (21, 22, 23, 25, 26) to form a very compact construction. The display (27) may be mounted into the frame (24), following the surface structure of the other objects to appear embedded into the multifunction unit (1). It is clear that the outer surface of this controller need not be tube-shaped, but may have any shape, such as a pyramid or a cone.

The invention claimed is:

1. A multifunction unit for control of multimedia equipment, the multifunction unit comprising:
 a first object being a touch pad or a rotatable element rotatable in relation to the multifunction unit that is adapted to detect a rotational movement in a plane, the rotatable element or the touch pad being engageable by a user at an upper surface at least substantially in plane or at a circumferential surface portion at least substantially in plane,
 a second object having a part adapted to detect a rotational movement along a circumferential surface portion at least substantially in plane,
 a third object having one, two or more user activatable elements positioned in or at an outer circumference at least substantially in plane, wherein one of the user activatable elements of the third object is located on a perimeter of the third object and is a rotational lever configured to have a rotational axis parallel to a rotational axis of the first object,
 an other object having one, two or more user activatable elements at or in a surface at least substantially along the plane, and
 a display configured to display a number of items, wherein the display is operated to graphically indicate an item at a position pointed to by a mechanical position of the rotational lever.

2. The multifunction unit according to claim 1, wherein the first object is configured with a device to detect rotations stimulated by user activations via the first object.

3. The multifunction unit according to claim 1, wherein the first or the other object is configured with a device to detect user given activations via the two or more buttons of the first object.

4. The multifunction unit according to claim 1, wherein the second object is configured with a device to detect rotations stimulated by user activations of a perimeter of the second object.

5. The multifunction unit according to claim 1, wherein the third object is configured with a device to detect user activations on one or more buttons located on a perimeter of the third object, the one or more buttons is at least one of a push-type button, a pull-type button, a lever arm, a slider, and a rotational wheel.

6. The multifunction unit according to claim 1, further comprising a fourth object being configured with a device to mount a display screen onto the fourth object.

7. A method of operating the multifunction unit according to claim 1, the method comprising a user rotating the rotational lever and the display illustrating a number of items and graphically indicating a position pointed to by the mechanical position of the rotational lever.

8. The multifunction unit according to claim 1, wherein the first object, the second object, the third object and the other object are co-axially aligned.

9. A multifunction unit for control of multimedia equipment, the multifunction unit comprising:
 a first object being a rotational device configured to have a rotational axis perpendicular to a horizontal surface plane of the multifunction unit,
 two or more buttons disposed inside a perimeter of a touch pad or rotatable element rotatable in relation to the multifunction unit where the two or more buttons are aligned along one or more of radial lines having a center point at a center of the rotating device, a second object being a rotational device configured to have a rotational axis parallel to the rotational axis of the first object,
 a third object being a device configured to have one or more buttons on a surface of a perimeter of the third object, and
 a fourth object being a device that constitutes a fixture for an assembly including the first object, the second object and the third object.

10. A multimedia device having integrated the multifunction unit of claim 9, wherein the multimedia device comprising:
 a device to present information accessed from/to external sources and information related to processing of data and information on the unit itself, the information being at least one of text, graphics, audio, video, Tele and interactive media data, and
 a device to execute control commands and responses as given from the multifunction unit.

11. The multimedia device according to claim 10, wherein the multimedia device having the multifunction unit is integrated fully or partly along one of border lines of the multifunction unit.

12. The multimedia device according to claim 10, wherein the multimedia device includes the multifunction objects in different configurations by combining two or more objects.

13. The multifunction unit according to claim 9, wherein the first object is configured with a device to detect rotations stimulated by user activations via the first object.

14. The multifunction unit according to claim 9, wherein the first or the other object is configured with a device to detect user given activations via the two or more buttons of the first object.

15. The multifunction unit according to claim 9, wherein the second object is configured with a device to detect rotations stimulated by user activations of the perimeter of the second object.

16. The multifunction unit according to claim 9, wherein the third object is configured with a device to detect user activations on the one or more buttons located on the perimeter of third object, the one or more buttons is at least one of a push type button, a pull-type button, a lever arm, a slider and a rotational wheel.

17. The multifunction unit according to claim 9, wherein one of the buttons of the third object is located on a perimeter of the third object and is a rotational device configured to have a rotational axis parallel to the rotational axis of the first object.

18. The multifunction unit according to claim 9, further comprising a display configured to display a number of items, wherein a button of the third object of the rotational device is a rotational lever, and wherein the display is operated to graphically indicate an item at a position pointed to by a mechanical position of the rotational lever.

19. The method of operating the multifunction unit according to claim 18, further comprising a user rotating the rotational lever and the display illustrating a number of items and graphically indicating a position pointed to by the mechanical position of the rotational lever.

20. A multifunction unit for control of multimedia equipment, the multifunction unit comprising:
- a first object being a touch pad or a rotatable element rotatable in relation to the multifunction unit that is adapted to detect a rotational movement in a plane, the rotatable element or the touch pad being engageable by a user at an upper surface at least substantially in plane or at a circumferential surface portion at least substantially in plane, and the rotational element configured to have a rotational axis perpendicular to a horizontal surface plane of the multifunction unit,
- a second object having a part adapted to detect a rotational movement along a circumferential surface portion at least substantially in plane, and the second object being configured to have a rotational axis parallel to the rotational axis of the first object,
- a third object having one, two or more user activatable elements positioned in or at an outer circumference at least substantially in plane, and
- an other object having one, two or more user activatable elements at or in a surface at least substantially along the plane.

\* \* \* \* \*